(12) United States Patent  
Kang

(10) Patent No.: US 6,364,229 B1  
(45) Date of Patent: Apr. 2, 2002

(54) FISHING REEL CRANK HANDLE WITH DYNAMIC BALANCING STRUCTURE

(75) Inventor: Young Jue Kang, Tulsa, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/511,031

(22) Filed: Feb. 23, 2000

(51) Int. Cl.[7] ............................................... A01K 89/01
(52) U.S. Cl. ........................ 242/283; 242/282; 74/574; D22/140
(58) Field of Search ............................... 242/282, 283, 242/224; 74/545; D22/140, 141

(56) References Cited

U.S. PATENT DOCUMENTS

| | | | | |
|---|---|---|---|---|
| 391,992 A | * | 10/1888 | Turner | 242/283 |
| 627,767 A | * | 6/1899 | Wisner | 242/283 |
| 2,002,403 A | * | 5/1935 | Kosma | 242/283 |
| 2,380,213 A | * | 7/1945 | Boor | 242/282 |
| 2,691,309 A | * | 10/1954 | Caroland | 242/283 |
| RE24,153 E | * | 5/1956 | Lockwood | 242/283 |
| 3,166,267 A | * | 1/1965 | Rowe | 242/224 |
| D223,606 S | * | 5/1972 | Hess | D22/140 |
| 3,727,859 A | * | 4/1973 | Chann | 242/224 |
| D300,843 S | * | 4/1989 | Doi et al. | D22/140 |
| 5,183,221 A | * | 2/1993 | Kawai et al. | 242/282 |
| 5,538,198 A | * | 7/1996 | Hirano et al. | 242/283 |
| 5,547,141 A | * | 8/1996 | Yeh | 242/282 |
| D373,404 S | * | 9/1996 | Atherton et al. | D22/140 |
| 5,577,678 A | * | 11/1996 | Murayama | 242/283 |
| D383,191 S | * | 9/1997 | Atherton et al. | D22/141 |
| D404,792 S | * | 1/1999 | Oh | D22/140 |
| D414,237 S | | 9/1999 | Kang et al. | |
| 6,032,893 A | * | 3/2000 | Sekimoto et al. | 242/283 |
| D423,634 S | * | 4/2000 | Tao et al. | D22/140 |
| D423,635 S | * | 4/2000 | Robbins | D22/141 |
| 6,105,891 A | * | 8/2000 | Ikuta et al. | 242/283 |

* cited by examiner

*Primary Examiner*—Emmanuel M. Marcelo  
(74) *Attorney, Agent, or Firm*—Wood, Phillips, VanSanten, Clark & Mortimer

(57) ABSTRACT

A fishing reel having a frame and an operating mechanism on the frame. The operating mechanism includes a line carrying spool, an element that is rotatable relative to the frame around a first axis to cause line to be directed onto the spool, and a crank handle that is rotatable relative to the frame around a second axis to thereby cause the first element to be rotated around the first axis. The crank handle has a body with a first portion projecting radially in one direction from the second axis, a graspable element on the first body portion, and a counterbalance assembly. The counterbalance assembly includes a second portion of the body which projects radially from the second axis oppositely to the one direction and a first weight element attached to the second portion of the body.

21 Claims, 5 Drawing Sheets

FISHING REEL CRANK HANDLE WITH DYNAMIC BALANCING STRUCTURE

BACKGROUND OF THE INVENTION

1. Field of the Invention

This invention relates to fishing reels of the type having a crank handle that is operable to retrieve line onto a line carrying spool and, more particularly, to a crank handle having a balancing structure thereon to facilitate cranking and contribute to dynamic balancing.

2. Background Art

Most conventional fishing reels utilize a crank handle that is rotatable by a user to in turn rotate an element to thereby effect line retrieval over a spool. In baitcast-type fishing reels, the crank handle causes rotation of the spool itself. In a spinning-type reel, a rotor with a bail assembly thereon is rotatable through the crank handle to wrap line around a spool that is oscillated to contribute to even line lay thereon.

In spinning-type reels, a significant rotational torque may have to be imparted to the crank handle to effect rotation of the rotor at the desired angular velocity. To permit a substantial torque to be applied, the crank handle may be constructed with a graspable knob that is offset a substantial distance from the rotational axis of the crank handle. While this produces a substantial moment arm, in the absence of some sort of balancing structure, the crank handle tends to vibrate or wobble which may result in a rough feel during operation.

To address this problem, it is known to counterbalance the crank handle portion extending away from the crank handle axis to the knob. This is accomplished by extending the crank handle to a diametrically opposite location from the knob and forming a weighted portion, which is commonly an integral enlargement of the crank handle, as shown for example in U.S. Pat. No. Des. 414,237.

Since each spinning-type fishing reel has unique dynamic operating characteristics, due principally to varying rotor and bail assembly designs, optimal performance in balancing may require customizing each crank handle to the particular reel.

SUMMARY OF THE INVENTION

In one form, the invention is directed to a fishing reel having a frame and an operating mechanism on the frame. The operating mechanism includes a line carrying spool, an element that is rotatable relative to the frame around a first axis to cause line to be directed onto the spool, and a crank handle that is rotatable relative to the frame around a second axis to thereby cause the first element to be rotated around the first axis. The crank handle has a body with a first portion projecting radially in one direction from the second axis, a first graspable element on the first body portion, and a counterbalance assembly. The counterbalance assembly includes a second portion of the body which projects radially from the second axis oppositely to the one direction and a first weight element attached to the second portion of the body.

In one form, the first weight element is in a fixed, stationary position on the second body portion.

The first weight element may be separate from, and maintained in a fixed stationary position on, the second body portion.

The first weight element may be maintained on the second body portion by a threaded fastener.

The first weight element may be maintained on the second body portion by an adhesive.

In one form, the second body portion defines a cavity and the first weight element is mounted in the cavity.

The cavity may have a predetermined shape, with the first weight element having a shape that is complementary to the predetermined shape of the cavity.

In one form, the first weight element is formed in situ within the cavity.

The counterbalance assembly may further include a second weight element on the second portion of the body.

The invention is also directed to the combination of (a) a fishing reel, as described above, and b) first and second weight elements that are interchangeably mountable on the second portion of the body as part of the counterbalance assembly.

The first and second weight elements may have at least one of a different size, shape, weight, and composition.

A third element may be mountable to the second body portion in conjunction with one of the first and second weight elements.

The combination may further include a second graspable element that is interchangeably mountable with the first graspable element on the first portion of the body.

The invention is also directed to a crank handle for rotating an element on a fishing reel, which crank element has a body having a rotary axis, a first portion projecting radially in one direction away from the rotary axis, and a second portion projecting radially from the rotary axis oppositely to the one direction. The crank handle further has a weight element that is separate from, and maintained in a fixed stationary position on, the second body portion.

The invention is further directed to the combination of a crank handle, for rotating an element on a fishing reel, and first and second weight elements. The crank handle has a body with a rotary axis, a first portion projecting radially in one direction away from the rotary axis, and a second portion projecting radially from the rotary axis oppositely to the one direction. The first and second weight elements are at least one of interchangeably mountable on the second portion of the body and mountable together on the second portion of the body.

The combination may further include first and second graspable elements that are interchangeably mountable on the first portion of the body.

DETAILED DESCRIPTION OF THE PREFERRED EMBODIMENT

Figure 1:
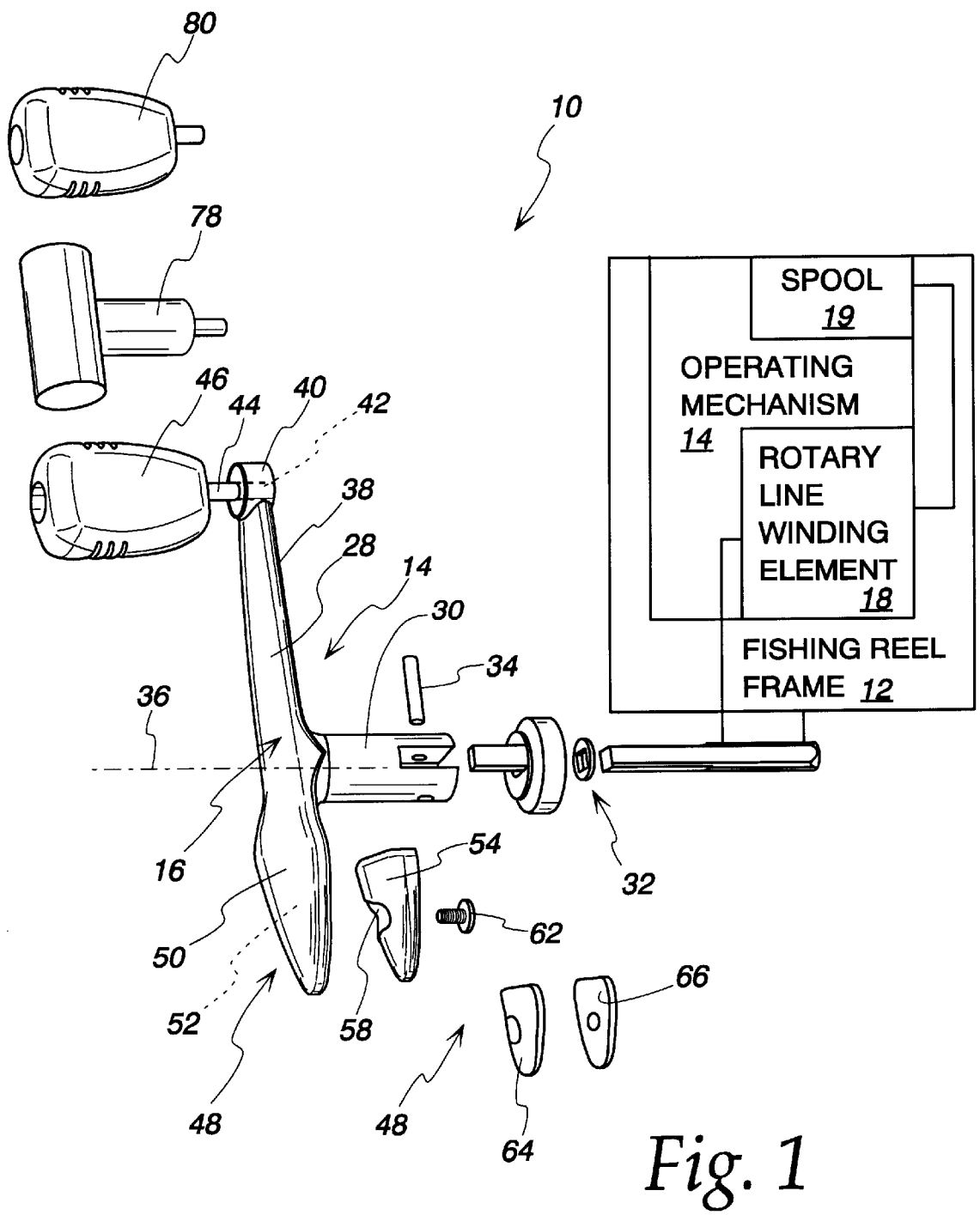
FIG. 1 is an exploded perspective view of a crank handle operably associated with a rotary line winding element on a fishing reel frame, shown schematically in FIG. 1, in combination with different interchangeable graspable elements and weight elements, according to the present invention.

Referring initially to FIG. 1, a fishing reel, according to the present invention, is shown at 10, partially in schematic form. The fishing reel 10 consists of a frame 12 on which an operating mechanism 14 is mounted. The operating mechanism 14 includes a crank handle 16 which rotates a line winding element 18 to retrieve line onto a spool 19.

Figure 6:
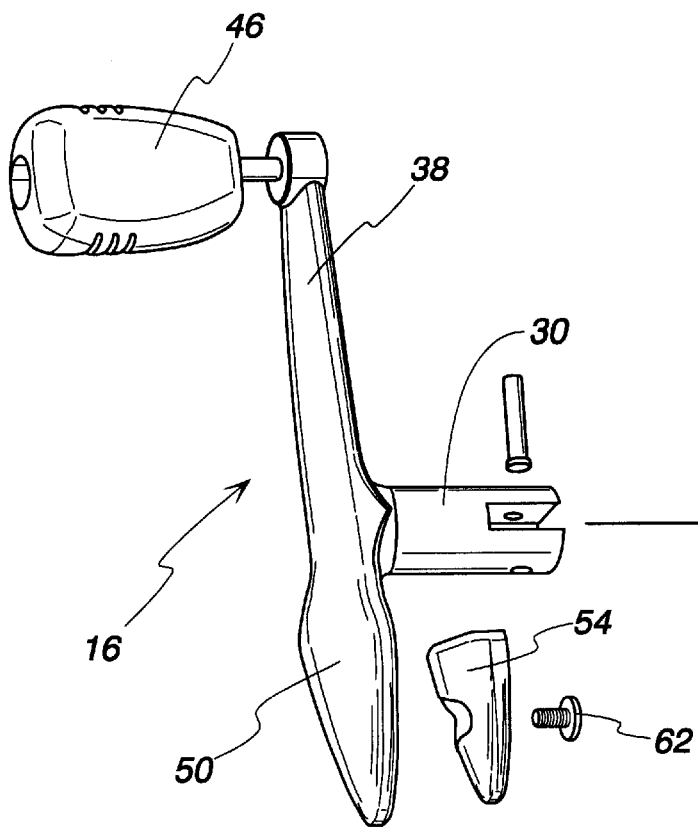
FIG. 6 is an exploded, perspective view showing the crank handle, according to the present invention, operatively connected to four different types of fishing reel designs, shown in schematic form.

The crank handle 16 can be used on a number of different reel constructions. In FIG. 6, the crank handle 16 is shown operatively connected, alternatively, to a spinning-type fishing reel 20, a spincast-type fishing reel 22, a baitcast-type fishing reel 24, and a fly fishing reel 26. The details of the structure of these different types of reels 20,22,24,26 are peripheral to the present invention. It suffices to say that the crank handle 16 in each style reel causes a rotary line winding element to cause line to be directed onto a spool. The details of a conventional spinning-type fishing reel 20, into which the crank handle 16 can be incorporated, are shown in U.S. Pat. No. 4,676,450, to Carpenter et al, which is incorporated herein by reference. Similarly, details of a suitable spincast-type fishing reel 22 and baitcast-type fishing reel 24 are shown in U.S. Pat. No. 5,199,665, to Tipton, and U.S. Pat. No. 5,810,263, to Carpenter, each incorporated herein by reference.

Referring again to FIG. 1, the crank handle 16 consists of an elongate body 28 with a transverse mounting stem 30. The mounting stem 30 is connected to the remainder of the reel 10 through a shaft subassembly 32 held in place by a post 34. With the crank handle 16 operatively connected, rotation of the crank handle 16 around the mounting stem axis 36 causes rotation of the rotary line winding element 18 about its axis.

Figure 4:
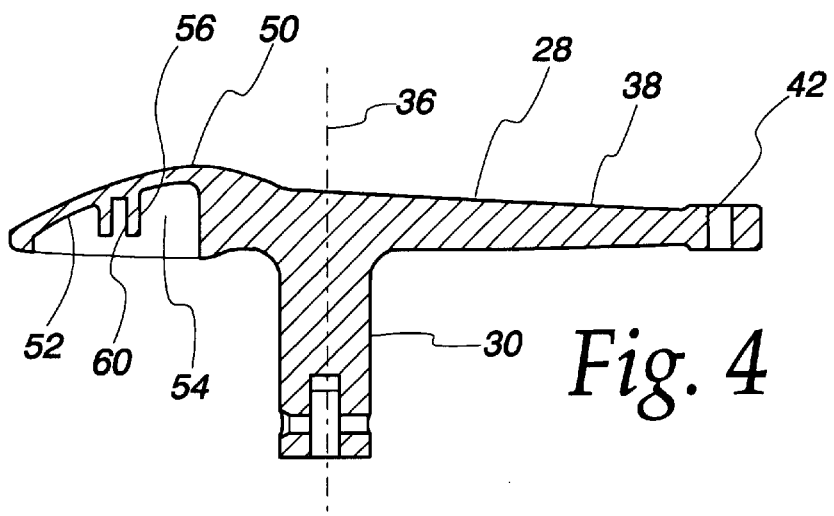
FIG. 4 is a cross-sectional view of a body on the crank handle, taken along line 4—4 of FIG. 3.
Figure 5:
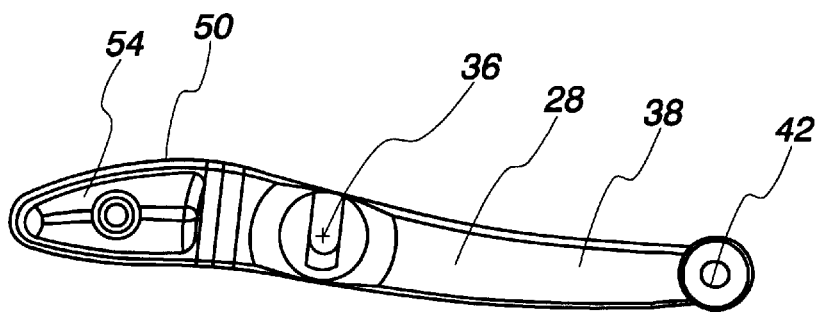
FIG. 5 is a side elevation view of the crank handle body in FIG. 4.

The body 28 has a counterbalance assembly 48 on a second portion 50 thereof, which counterbalance assembly 48 projects diametrically oppositely to the first portion 38 relative to the central axis 36. As seen also in FIGS. 4 and 5, the second portion 50 of the body 28 is enlarged and is formed with a cavity 52 for a counterbalancing weight element 54, which cavity 52 opens toward the frame 12. In this embodiment, the cavity 52 is spaced fully from the axis diametrically opposite to the crank handle. The second portion 50 is formed to define a mounting post 56 within the cavity 52 to project into a bore 58 through the weight element 54. The mounting post 56 has a blind, threaded bore 60 to accept a threaded fastener 62 which projects through the weight element 54. In the form shown, the cavity 52 has a predetermined configuration, with the weight element 54 having a complementary shape to be relatively snugly received in the cavity 52 without there being an excessive amount of space for the weight element 54 to substantially reorient.

The body 28 has a counterbalance assembly 48 on a second portion 50 thereof, which projects diametrically oppositely to the first portion 38 from the central axis 36. As seen also in FIGS. 4 and 5, the second portion 50 of the body 28 is enlarged and is formed with a cavity 52 for a counterbalancing weight element 54. In this embodiment, the second portion 50 is formed to define a mounting post 56 within the cavity 52 to project into a bore 58 through the weight element 54. The mounting post 56 has a blind, threaded bore 60 to accept a threaded fastener 62 which projects through the weight element 54. In the form shown, the cavity 52 has a predetermined configuration, with the weight element 54 having a complementary shape to be relatively snugly received in the cavity 52 without there being an excessive amount of space for the weight element 54 to substantially reorient.

The weight element 54 can be made from different materials to vary its weight for a given size. For example, the weight element 54 could be made from different metals. Alternatively, the weight element 54 could be made from plastic or a composite material.

In FIG. 1, a modified form of weight element 64 is shown. The weight element 64 has a smaller size than the weight element 54, and a slightly different shape. One or both of the weight elements 54, 64 can be held captively in place by a cover 66, through which the fastener 62 extends.

With these different weight elements 54, 64, the crank handle body 28 can be made with a universal construction. At the point of manufacture, the weight elements 54,64 are available for interchangeable mounting within the cavity 52. The manufacturer can select a desired degree of counterbalancing through the selection of weight elements. Additional weight elements having different weights and configurations can also be kept on hand for use.

Figure 2:
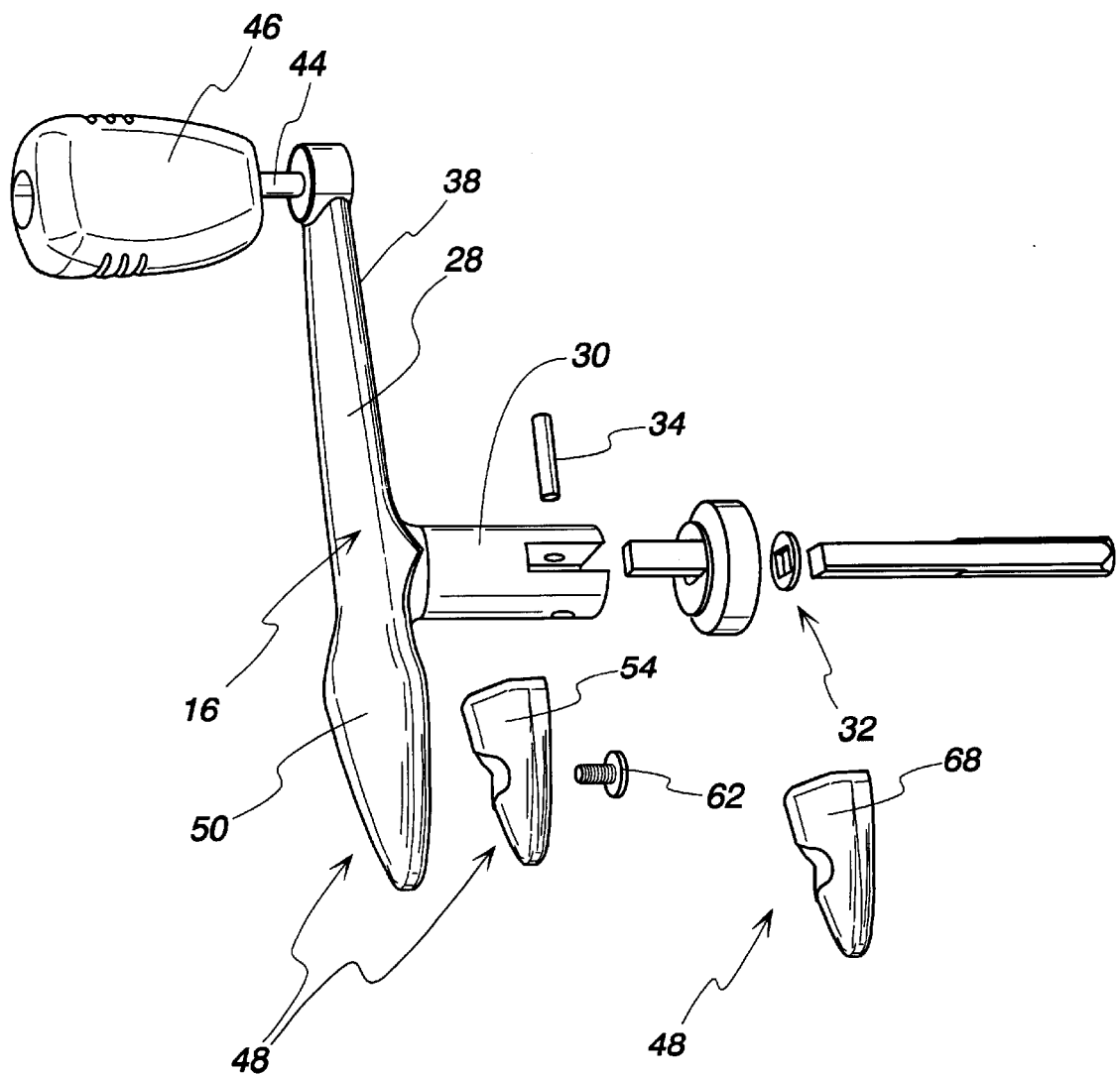
FIG. 2 is an exploded perspective view of the crank handle in FIG. 1 with one form of graspable handle thereon and two interchangeable weight elements.

In FIG. 2, the inventive concept is shown with the aforementioned weight element 54 and a weight element 68 having the same configuration but a different weight. The weight elements 54,68 are interchangeably mountable. The weight difference may be attributable to different materials, as previously described, or making one or the other of the weight elements 54,68 hollow, or more hollow than the other.

Figure 3:
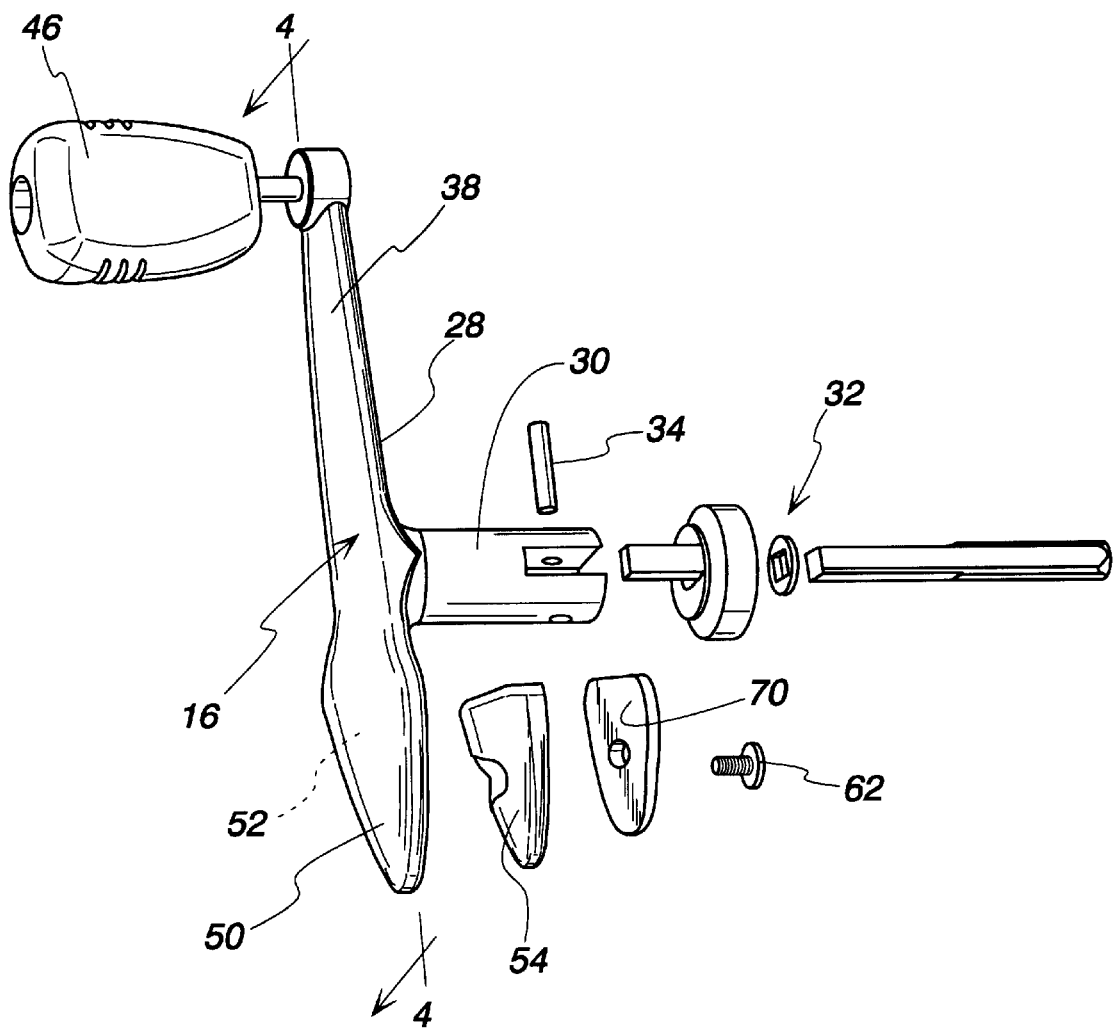
FIG. 3 is a view of the crank handle as in FIG. 2 with two weight elements that can be simultaneously mounted.

A still further modification is shown in FIG. 3 wherein the weight element 54 is mounted to the second body portion 50 within the cavity 52 through the fastener 62. An additional weight element 70, in the form of a cover, is mounted to the second portion 50 of the body 28 together with the weight element 54 through the fastener 62. The weight element cover 70 captively holds the weight element 54 in place. This allows an increase in the counterbalancing mass on the second portion 50 of the body 28.

Figure 7:
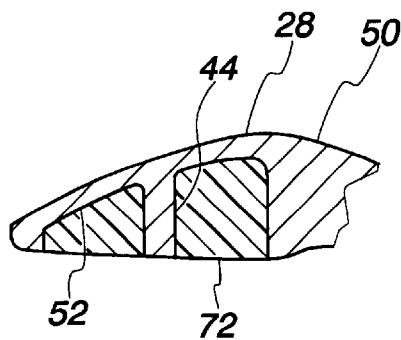
FIG. 7 is an enlarged, fragmentary, cross-sectional view of a modified form of body and weight element combination on a crank handle, according to the present invention, wherein the weight element is poured in situ within a cavity.

In FIG. 7, a further modified form of weight element is shown at 72. In this embodiment, the weight element 72 is a mass that is formed in situ so as to fill or partially fill the cavity 52. The material defining the weight element 72 may be a metal or plastic material. In this version, it is shown to be plastic. The mounting post 44 serves only an anchoring function and could be eliminated if so desired.

Figure 8:
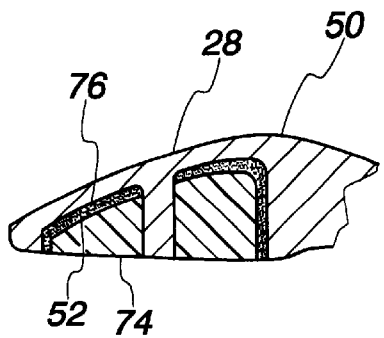
FIG. 8 is a view as in FIG. 7 wherein a weight element is maintained in the cavity by an adhesive.

In FIG. 8, a further modified form of weight element is shown at 74. In this case, the weight element 74 is maintained in the cavity 52 through an adhesive 76.

Other weight element constructions and methods of attaching the same in a fixed, stationary position with respect to the crank handle body 28 are contemplated by the invention and would be apparent to those skilled in this particular art after reading this disclosure.

The invention contemplates not only the interchangeability of the weight elements, but also the interchangeability of different constructions of graspable elements 46,78,80, as seen in FIG. 1. The graspable element 78 has a different shape and may be made from a different material to have a different mass and weight. The graspable element 80 has a shape similar to the graspable element 46 but a smaller size and could be made from the same or a different material as that from which the graspable element 46 is constructed.

The body 28, having a universal construction, can thus be kept on hand, with the manufacturer selecting the desired graspable element 46,78,80 and the desired weight element construction, as previously described. Substantial flexibility and potential savings in terms of manufacturing costs attributable to inventory reduction, may result.

The body 28 can also be sold to the end user with the options of interchanging the weight elements. Preferably, the selection of elements is made at point of manufacture, but the possibility of selling this kit to an end user exists.

While the invention has been described with particular reference to the drawings, it should be understood that various modifications could be made without departing from the spirit and scope of the present invention.

What is claimed is:

1. A fishing reel comprising:

a frame; and an operating mechanism on the frame, the operating mechanism comprising:

i) a line carrying spool;

ii) an element that is rotatable relative to the frame around a first axis, the element causing line to be directed onto the line carrying spool as the element is rotated; and iii) a crank handle which is rotatable relative to the frame around a second axis to thereby cause the element to be rotated around the first axis, the crank handle comprising a body having a first portion projecting radially in one direction from the second axis, a first graspable element on the first body portion, and a counterbalance assembly, the counterbalance assembly comprising a second portion of the body which projects radially from the second axis oppositely to the one direction and a first weight element separate from and releasably attached to the second portion of the body, wherein the second portion of the body defines a cavity opening towards the frame and the first weight is attached to the second portion of the body by placement within the cavity.

2. The fishing reel according to claim 1 wherein the first weight element is attached in a fixed stationary position on the second body portion.

3. The fishing reel according to claim 1 wherein the first weight element is maintained on the second body portion by a threaded fastener that is separate from the first weight element.

4. The fishing reel according to claim 1 wherein the first weight element is maintained on the second body portion by an adhesive.

5. The fishing reel according to claim 4 wherein the cavity has a predetermined shape and the first weight element has a shape that is complementary to the predetermined shape of the cavity.

6. The fishing reel according to claim 1 wherein the first weight element is captively maintained in the cavity by a cover element.

7. The fishing reel according to claim 1 wherein the counterbalance assembly further comprises a second weight element on the second portion of the body.

8. The fishing reel according to claim 1 wherein the first weight element and cavity are complementarily shaped so that the first weight element is snugly received in the cavity without there being an amount of space sufficient for the weight element to substantially reorient.

9. In combination:

(a) a fishing reel comprising:

a frame; and an operating mechanism on the frame, the operating mechanism comprising:

i) a line carrying spool;

ii) an element that is rotatable relative to the frame around a first axis, the element causing line to be directed onto the line carrying spool as the element is rotated; and iii) a crank handle which is rotatable relative to the frame around a second axis to thereby cause the element to be rotated around the first axis, the crank handle comprising a body having a first portion projecting radially in one direction from the second axis, a first graspable element on the first body portion, and a counterbalance assembly, the counterbalance assembly comprising a second portion of the body which projects radially from the second axis oppositely to the one direction, the second portion of the body defining a cavity which is spaced fully from the second axis; and (b) first and second weight elements that are interchangeably mountable in a fixed predetermined position within the cavity on the second portion of the body as part of the counterbalance assembly.

10. The combination according to claim 9 wherein the first and second weight elements have at least one of a different size, shape, and weight.

11. The combination according to claim 9 wherein the first and second weight elements have a different composition.

12. The combination according to claim 9 further comprising a third weight element that is mountable to the second body portion in conjunction with one of the first and second weight elements.

13. The combination according to claim 9 further comprising a second graspable element that is interchangeably mountable with the first graspable element on the first portion of the body.

14. The combination according to claim 13 where the second graspable element has at least one of a different shape, a different size, a different weight, and a different composition than the first graspable element.

15. A crank handle for rotating an element on a fishing reel, the crank handle comprising:

a body having a rotational axis, a first portion projecting radially in one direction away from the rotational axis, and a second portion projecting radially from the rotational axis oppositely to the one direction, said body defining a cavity; and a weight element that is separate from and maintained in a fixed, stationary position on the second body portion, wherein there is a mounting post on the second portion of the body which projects into the cavity and into the weight element with the weight element attached to the second portion of the body.

16. In combination:

(a) a crank handle for rotating an element on a fishing reel, the crank handle comprising:

a body having a rotational axis, a first portion projecting radially in one direction away from the rotational axis, and a second portion projecting radially from the rotational axis oppositely to the one direction; and (b) first and second weight elements that are mountable one against the other in a stationary position on the second portion of the body.

17. The crank handle according to claim 16 further comprising first and second graspable elements that are interchangeably mountable on the first portion of the body.

18. A fishing reel comprising:

a frame; and an operating mechanism on the frame, the operating mechanism comprising:

i) a line carrying spool;

ii) an element that is rotatable relative to the frame around a first axis, the element causing line to be directed onto the line carrying spool as the element is rotated; and iii) a crank handle which is rotatable relative to the frame around a second axis to thereby cause the element to be rotated around the first axis, the crank handle comprising a body having a first portion projecting radially in one direction from the second axis, a first graspable element on the first body portion, and a counterbalance assembly, the counterbalance assembly comprising a second portion of the body which projects radially from the second axis oppositely to the one direction and a first weight element separate from and releasably attached to the second portion of the body, wherein the second portion of the body defines a cavity opening towards the frame and the first weight is attached to the second portion of the body by placement within the cavity, wherein the first weight element is maintained on the second body portion by a threaded fastener that is separate from the first weight element, said fishing reel further comprising a cover element, wherein the threaded fastener extends through the cover element so that the weight element is captively maintained in the cavity by the cover element.

19. A fishing reel comprising:

a frame; and an operating mechanism on the frame, the operating mechanism comprising:

i) a line carrying spool;

ii) an element that is rotatable relative to the frame around a first axis, the element causing line to be directed onto the line carrying spool as the element is rotated; and iii) a crank handle which is rotatable relative to the frame around a second axis to thereby cause the element to be rotated around the first axis, the crank handle comprising a body having a first portion projecting radially in one direction from the second axis, a first graspable element on the first body portion, and a counterbalance assembly, the counterbalance assembly comprising a second portion of the body which projects radially from the second axis oppositely to the one direction and a first weight element separate from and releasably attached to the second portion of the body, wherein the second portion of the body defines a cavity opening towards the frame and the first weight is attached to the second portion of the body by placement within the cavity, said fishing reel further comprising a second weight element which is placed against the first weight element within the cavity.

20. A fishing reel comprising:

a frame; and an operating mechanism on the frame, the operating mechanism comprising:

i) a line carrying spool;

ii) an element that is rotatable relative to the frame around a first axis, the element causing line to be directed onto the line carrying spool as the element is rotated; and iii) a crank handle which is rotatable relative to the frame around a second axis to thereby cause the element to be rotated around the first axis, the crank handle comprising a body having a first portion projecting radially in one direction from the second axis, a first graspable element on the first body portion, and a counterbalance assembly, the counterbalance assembly comprising a second portion of the body which projects radially from the second axis oppositely to the one direction and a first weight element separate from and releasably attached to the second portion of the body, wherein the second portion of the body defines a cavity opening towards the frame and the first weight is attached to the second portion of the body by placement within the cavity, wherein there is a mounting post on the second portion of the body which projects into the cavity and into the first weight element with the first weight element attached to the second portion of the body.

21. The fishing reel according to claim 20 wherein the mounting post has a threaded bore therein to receive a fastener that maintains the first weight element on the second body portion.

* * * * *